US012662864B2

(12) United States Patent
Kim et al.

(10) Patent No.: US 12,662,864 B2
(45) Date of Patent: Jun. 23, 2026

(54) DOOR HANDLE ASSEMBLY FOR VEHICLE

(71) Applicant: SL Corporation, Daegu (KR)

(72) Inventors: Duk Hyun Kim, Gyeongsan-si (KR); Boo Seob Kim, Gyeongsan-si (KR); Do Heoun Park, Gyeongsan-si (KR); Dong Hwan Lee, Gyeongsan-si (KR); Eun Hee Park, Gyeongsan-si (KR)

(73) Assignee: SL Corporation, Daegu (KR)

( * ) Notice: Subject to any disclaimer, the term of this patent is extended or adjusted under 35 U.S.C. 154(b) by 87 days.

(21) Appl. No.: 18/597,220

(22) Filed: Mar. 6, 2024

(65) Prior Publication Data

US 2024/0392621 A1 Nov. 28, 2024

(30) Foreign Application Priority Data

May 26, 2023 (KR) ........................ 10-2023-0068459

(51) Int. Cl.
*E05B 85/10* (2014.01)
*E05B 85/00* (2014.01)
*E05F 15/608* (2015.01)

(52) U.S. Cl.
CPC ............ *E05F 15/608* (2015.01); *E05B 85/00* (2013.01); *E05B 85/107* (2013.01); *E05Y 2201/624* (2013.01); *E05Y 2201/71* (2013.01); *E05Y 2900/53* (2013.01)

(58) Field of Classification Search
CPC ... E05B 85/103; E05B 85/107; E05Y 2201/71
USPC .................................................... 49/339–342
See application file for complete search history.

(56) References Cited

U.S. PATENT DOCUMENTS 6,062,614 A * 5/2000 Petzold .................... E05B 85/14 292/DIG. 31
6,135,536 A * 10/2000 Ciavaglia .............. E05F 15/614 49/335
7,194,840 B2 * 3/2007 Zimmermann ........... E05B 7/00 49/460
9,458,649 B2 * 10/2016 Fujiwara ................. E05B 81/56
11,396,764 B2 * 7/2022 Blount ..................... E05B 81/76
11,851,920 B2 * 12/2023 Peterson ................. E05B 81/06
(Continued)

FOREIGN PATENT DOCUMENTS

DE 102013016885 A1 * 6/2014 ............. E05B 81/76
EP 0198766 A1 * 10/1986 ............. E05B 85/18
KR 20220089334 A * 6/2022 ............. G06V 40/14

*Primary Examiner* — Carlos Lugo
(74) *Attorney, Agent, or Firm* — United One Law Group LLC; Kongsik Kim; Jhongwoo Peck

(57) ABSTRACT

A door handle assembly for a vehicle includes a housing having an opening formed therein; a handle cover configured to be rotated inside the housing in a first direction to uncover the opening, or rotates in a second direction to cover the opening; a switch provided adjacent to the opening of the housing to allow a door of the vehicle to be opened in a state where the handle cover uncovers the opening; and a driving member that rotates the handle cover to uncover or cover the opening. In particular, the driving member allows the handle cover to be rotated with respect to a first rotation axis, and at the same time, a second rotation axis, which is spaced apart from the first rotation axis and revolves around the first rotation axis, such that the handle cover is moved by both a translational motion and a rotational motion.

10 Claims, 13 Drawing Sheets

(56) References Cited

U.S. PATENT DOCUMENTS

| | | | | |
|---|---|---|---|---|
| 2018/0245387 | A1* | 8/2018 | Suzuki | E05D 7/081 |
| 2019/0234121 | A1* | 8/2019 | Pudney | E05B 85/103 |
| 2023/0258029 | A1* | 8/2023 | Philippe | E05B 85/103<br>70/277 |
| 2023/0417090 | A1* | 12/2023 | Guerin | E05C 19/022 |

* cited by examiner

DOOR HANDLE ASSEMBLY FOR VEHICLE

CROSS-REFERENCE TO RELATED APPLICATION

This application claims priority from Korean Patent Application No. 10-2023-0068459 filed on May 26, 2023, which is incorporated herein by reference in its entirety.

BACKGROUND

1. Technical Field

The present disclosure relates to a hidden door handle assembly for a vehicle, which is used when a user pulls or rotates the door handle of the vehicle to open a door of the vehicle.

2. Description of the Related Art

Generally, door handles installed on the doors of vehicles come in various forms depending on the vehicle model. These vehicle door handles are broadly classified into a grip type and a lift up type depending on the direction of operation and shape. The two types described above have a structure that allows the user to open the door by putting their hand in a certain exposed space and pulling or rotating the handle.

In the case of the double lift up type, a separate hand insertion space is formed between the handle and the exterior of the door panel, which not only restricts the design, but also frequently causes outside air to flow into the operating part of the outside handle and enter the cabin when driving at high speeds.

In addition, in the case of the grip type, the housing portion is absent, so it provides an improved appearance than the lift up type, but it still has design limitations because a separate space for hand insertion should be formed outside the door panel.

To improve the inflow of outside air and design limitations, hidden type door handles are being developed. However, since such hidden type of door handle can fail to be exposed to the exterior when the vehicle's power is discharged or in an emergency situation, concerns are being raised in opening the door in such emergency situations.

SUMMARY

The present disclosure is intended to solve this problem. More specifically, an object of the present disclosure is to provide a door handle assembly for a vehicle, which is hidden inside the door and not exposed to the door surface of the vehicle when the vehicle is being driven or parked. When the door needs to be opened, the handle cover inside the door rotates so that the opening area of the door can be used as a door catch.

In addition, the present disclosure provides a hidden door handle assembly for a vehicle that does not have a separate door catch that the user can pull on the outside of the door, but still allows the door to be opened manually when the vehicle's power is discharged or in an emergency situation.

In order to achieve the above object, according to the present disclosure, a door handle assembly for a vehicle may include a housing having an opening formed on one side; a handle cover configured to be rotated inside the housing in a first direction to uncover the opening, or to be rotated in a second direction, which is opposite from the first direction, to cover the opening; a switch provided adjacent to the opening of the housing, the switch being configured to cause a door of the vehicle to be opened in a state where the handle cover uncovers the opening; and a driving member that rotates the handle cover to open or close the opening. The driving member may allow the handle cover to be rotated with respect to a first rotation axis, and at the same time, a second rotation axis, which is spaced apart from the first rotation axis and revolves around the first rotation axis, such that the handle cover is moved by both a translational motion and a rotational motion.

More specifically, the driving member may include a rotation shaft that rotates about the first rotation axis in response to a driving force transmitted to a proximate end thereof, a guide gear fixed inside the housing and having a first gear formed on an outer peripheral surface thereof, a link member, a first side of which is coupled to a distal end of the rotation shaft such that the rotation shaft and the link member rotate simultaneously, and a revolution shaft, in which a second gear is provided at one end to mesh with the first gear, that rotates about the second rotation axis and revolves around the rotation shaft.

In the driving member, a rotation angle of the revolution shaft may be formed to be greater than a rotation angle of the rotation shaft.

The driving member may be disposed on one side or both sides of the handle cover.

The handle cover may include a cover portion formed to correspond to a shape of the opening and configured to cover the opening, and an extension portion provided at rear of the cover portion to allow an interior space of the housing to be communicated with the opening in response to the cover portion being rotated away from the opening.

The handle cover may further include a reflective cover made of a transparent or translucent material and provided to connect the cover portion and the extension portion, wherein the reflective cover is configured to be visible through the opening as a curved surface on the opening, and a lighting portion that is disposed at an inside space between the cover portion and the reflective cover and irradiates light to be transmitted through the reflective cover when the opening is opened.

Further, the switch may be disposed in an upper region of the opening within the housing, and when the opening is opened, the light may be irradiated from the lighting portion to illuminate an operating region of the switch.

The door handle assembly may further include a manual opening module provided on one side of the opening inside the housing. As such, in response to power to the driving member being cut off, the manual opening module may allow the opening to be manually opened.

The manual opening module may include a button portion to allow a user to press it, and a linkage arm that rotates to unlock a door latch in response to the button portion being pressed.

The driving member may further include an elastic member that is coupled to the rotation shaft and provides an elastic restoring force to the link member to bias the handle cover toward a closed position.

According to the hidden door handle assembly for a vehicle according to an embodiment of the present disclosure, the following advantages may be achieved. First, the handle cover can undergo both a translational motion and a rotational motion, thereby securing a wider space for the user to push his/her hand into the accommodation space through the opening. Second, when the handle cover rotates, light can be irradiated through the lighting portion, thereby improving aesthetics and making it easier to find the switch. Third, since the handle cover is arranged to cover (e.g., shield) the accommodation space when driven or parked, the inflow of outside air and wind noise can be minimized, and at the same time, insects and foreign substances can be prevented from entering the interior of the vehicle. Fourth, even when the vehicle's power is completely discharged, the door can still be opened and closed manually.

The effects of the present disclosure are not limited to the effects mentioned above, and other effects not mentioned will be clearly understood by those skilled in the art from the disclosure.

BRIEF DESCRIPTION OF THE DRAWINGS

The summary set forth above as well as the detailed description of the exemplary embodiments of the present disclosure set forth below may be better understood in conjunction with the accompanying drawings. Exemplary embodiments are shown in the drawings for the purpose of illustrating the disclosure. However, it should be understood that the present disclosure is not limited to the exact arrangement and means shown in the drawings.

DETAILED DESCRIPTION

Figure 1:
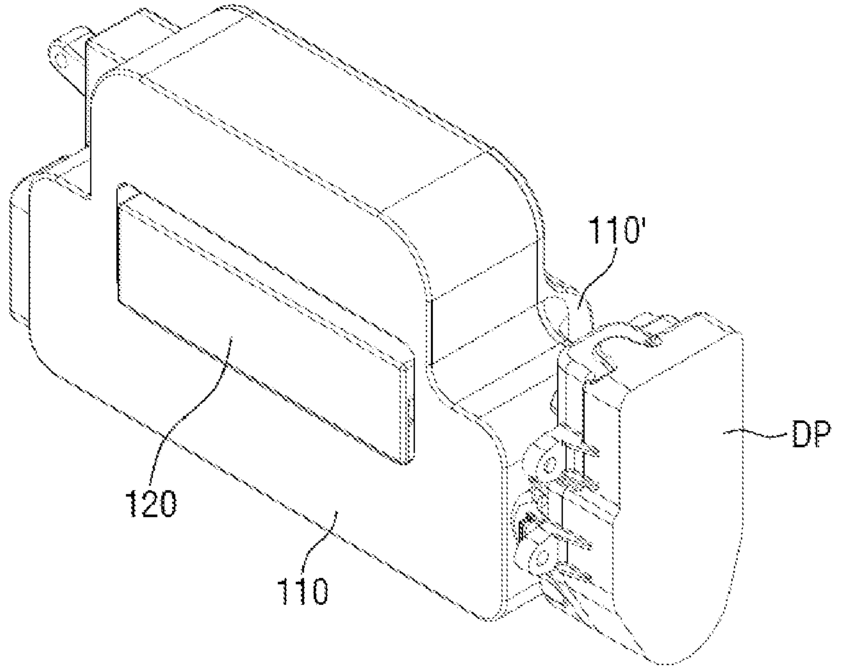
FIG. 1 is a perspective view showing a hidden door handle assembly for a vehicle according to an embodiment of the present disclosure.

Below, exemplary embodiments of the present disclosure are described in detail with reference to the attached drawings. The benefits and features of the present disclosure and the methods to achieve them will become clear when referring to the detailed embodiments along with the attached drawings. However, the present disclosure is not limited to the embodiments disclosed below and can be implemented in various different forms. The embodiments are provided solely to make the disclosure more thorough and to fully inform a person with ordinary skill in the art, and the invention is defined only by the scope of the claims. Throughout the specification, identical reference numbers refer to identical components.

The present disclosure is subject to various modifications and can have multiple embodiments; specific embodiments are exemplified and described in the drawings.

However, this is not intended to limit the present disclosure to specific embodiments. Rather, it should be understood to include all modifications, equivalents, or substitutes falling within the idea and technical scope of the present disclosure.

Terms that include ordinals such as "first," "second," etc., may be used to describe various components, but the components are not limited by these terms. These terms are used only to distinguish one component from another. For example, without departing from the scope of the present disclosure, a second component may be termed a first component, and similarly, a first component may be termed a second component.

The term "and/or" includes any combination of the listed related items or any of the related items.

When it is mentioned that one component is "connected to" or "coupled with" another component, it should be understood that it may be directly connected or coupled to the other component, or there may be another component in between. On the other hand, when it is mentioned that one component is "directly connected to" or "directly coupled with" another component, it should be understood that there are no other components in between.

The terms used in this application are only for describing particular embodiments and are not intended to limit the disclosure.

Singular expressions, unless explicitly stated otherwise in context, include plural expressions.

In this application, terms such as "include" or "have" are used to indicate the existence of the features, numbers, steps, operations, components, parts, or combinations thereof stated in the specification, and do not preclude the existence or addition of one or more other features, numbers, steps, operations, components, parts, or combinations thereof.

Embodiments of the present disclosure will hereinafter be described with reference to the accompanying drawings. The same reference numerals are assigned to identical or corresponding components, regardless of the drawing numbers, and redundant descriptions thereof are omitted.

Figure 2:
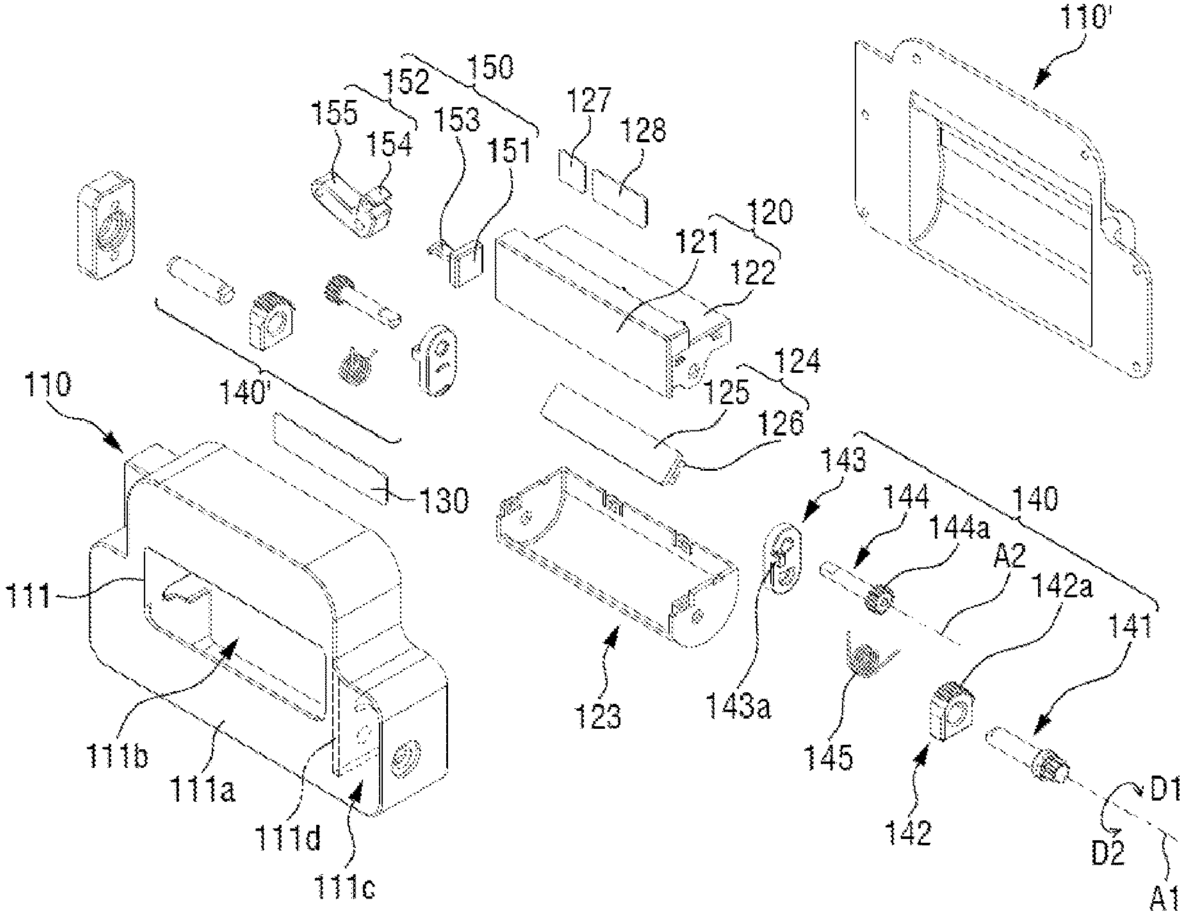
FIG. 2 is an exploded perspective view showing the hidden door handle assembly for a vehicle according to an embodiment of the present disclosure.

FIG. 1 is a perspective view showing a hidden door handle assembly for a vehicle according to an embodiment of the present disclosure, and FIG. 2 is an exploded perspective view showing the hidden door handle assembly for a vehicle.

Referring to FIGS. 1 and 2, the hidden door handle assembly 100 for a vehicle according to an embodiment of the present disclosure may include a housing 110, a handle cover 120, a switch 130, a driving member 140, and a manual opening module 150.

First, the housing 110 may have a substantially rectangular opening 111 formed along the horizontal direction in the center region thereof.

A front surface 111*a*, where the opening 111 is formed on the housing 110, may be assembled on the inside to correspond to an opening formed in the exterior door panel, or formed as a portion of the exterior door panel to be formed integrally with the exterior door panel. The housing 110 may include an accommodation space 111*b* formed inside, and a handle cover 120, a switch 130, and a manual opening module 150 may be disposed inside the accommodation space 111*b*. Further, a driving area 111*c* may be provided while being separated from the accommodation space 110*b*, and the driving member 140 may be disposed within the driving area 111*c*.

The housing 110 may be provided with a partition wall 111*d* to separate the accommodation space 111*b* and the driving area 111*c*. The partition wall 111*d* may be arranged so that a portion of the driving member 140 penetrates through the partition wall 111*d*, or a portion of the driving member 140 may be inserted and fixed to the partition wall 111*d* so that the driving member 140 is supported by the partition wall 111*d*.

The housing 110 may have driving areas 111*c* formed on both sides with respect to the accommodation space 111*b*. In such an embodiment, as one example, the accommodation space 111*b* may be formed at the inner center of the housing 110, and a driving area 111*c* that is at least partially separated from the accommodation space 111*b* may be provided at each end along the longitudinal direction of the handle cover 120. Further, the driving member 140 may be provided in each driving area 111*c*. In some other embodiments, the hidden door handle assembly 100 for a vehicle of the present disclosure may be configured so that the driving area 111*c* is provided only on one side of the accommodation space 111*b*, and the driving member 140 is provided therein.

The housing 110 may have a structure in which the rear portion that is opposite from the front surface is open, and a back cover 110' may be provided to cover the open rear portion.

Additionally, the switch 130 may provide a function to release the door latch from the door frame. The switch 130 may be disposed on the rear surface of the housing 110 in the accommodation space 111*b* inside the housing 110. As such, when the user inserts a finger through the opening 111 with the palm facing upward and grasps the housing 110, the finger may contact the switch 130 disposed on the back side of the housing 110.

Additionally, the handle cover 120 may be arranged to be rotatable within the accommodation space 111*b*. The handle cover 120 may include a cover portion 121, an extension portion 122, a reflective cover 123, and a lighting portion 124.

The cover portion 121 may be formed to correspond to the shape of the opening 111 and may be arranged to cover the opening 111 in the door closed state.

The extension portion 122 may extend to the rear of the cover portion 121, and both side ends may be connected to the driving member 140 so that a rotational force due to the rotation of the handle cover 120 in the opening and closing direction can be transmitted.

Further, the handle cover 120 may be arranged to rotate about a first rotation axis (A1) and simultaneously rotate about a second rotation axis (A2) spaced apart from the first rotation axis (A1). Therefore, since the rotational and translational movements of the handle cover 120 occur simultaneously, the inside of the accommodation space 111*b* may be exposed by the rotation of the handle door 120, and at the same time, the movement about the first rotation axis A1 may move the cover portion 121 away from the opening 111. Due to such movements of the handle cover 120, the hidden door handle assembly 100 for a vehicle can provide the advantage of more efficiently securing a space where the user can insert his or her hand into the accommodation space 111*b* through the opening 111.

Hereinafter, the rotational direction that opens the opening 111 from the state in which the opening 111 is covered by the handle cover 120 is defined as the first direction D1, and conversely, the rotational direction that rotates to cover the opening 111 from the state in which the opening 111 is fully open is defined as the second direction D2. Each component of the driving member 140 may also rotate along the first direction D1 or the second direction D2.

When the handle cover 120 rotates in the first direction D1 to open the opening 111, the space between the cover portion 121 and the extension portion 122 may be exposed on the opening 111 side. At this time, a reflective cover 123 may be disposed on a portion that is exposed to the opening 111 between the cover portion 121 and the extension portion 122. In other words, when the handle cover 120 is opened along the first direction D1, the reflective cover 123 may be exposed inside the accommodation space 111*b* and on the opening 111 side.

The reflective cover 123 may have a curved upper surface to ensure that the accommodation space 111*b* is sufficiently maintained when the user's hand enters and exits the accommodation space 111*b*. At the same time, the reflective cover 123 may reflect the light irradiated from the lighting portion 124 provided therein and set the irradiation direction of the light by refracting and/or reflecting the light. In some embodiments, the reflective cover 123 may be made of a flat surface rather than a curved surface, and in such embodiments, a polarizing plate that can set the direction of light may be provided on the reflective cover 123.

Additionally, the lighting portion 124 may include one or more PCB boards 125 and a plurality of LED modules 126 provided on the boards 125. The lighting portion 124 may be controlled such that the light is illuminated only when the handle cover 120 is opened.

At the rear of the cover portion 121, a touch sensor module 127 that detects when the user touches the front surface of the cover portion 121, and a near field communication (NFC) module 128 that detects a card key or smartphone equipped with an NFC chip may be provided.

Additionally, the driving member 140 may include a rotation shaft 141, a guide gear 142, a link member 143, a revolution shaft 144, and an elastic member 145. As described above, the driving members 140 and 140' may be respectively disposed on both sides of the handle cover 120, and since these configurations are substantially symmetrical, only the driving member 140 disposed on the right side as shown in FIG. 2 will be described here for convenience. The operation of the left side driving member 140' may be similarly understood.

The rotation shaft 141 may receive a driving force from a driving portion DP that uses a motor or an actuator and may be coupled to the driving area 111*c* to rotate about the first rotation axis A1. At this time, a proximate end of the rotation shaft 141 may be partially exposed to the outside of the driving area 111*c* for connection to the driving portion DP.

The guide gear 142 may include a first gear 142*a* formed on its outer surface and be fixed inside the driving area 111*c*. The rotation shaft 141 may be inserted to penetrate the guide gear 142 and may be inserted through the elastic member 145 along the coupling direction.

A first side (e.g., lower side) of the link member 143 may be coupled to a distal end of the rotation shaft 141.

The link member 143 may be disposed on the first rotation axis A1 so that the first side rotates simultaneously with the rotation of the rotation shaft 141. The revolution shaft 144 may be coupled to penetrate a second side (e.g., upper side) of the link member 143. Accordingly, the link member 143 may be formed to be elongated in a substantially oval shape from the first side to the second side, and may provide a function of connecting the rotational movements of the first rotation axis A1 and the second rotation axis A2.

The revolution shaft 144 may include a second gear 144*a* provided at a proximate end thereof, and a distal end thereof may be fixed to the side surface of the handle cover 120 while penetrating the second side of the link member 143. The second gear 144*a* may be arranged to mesh with the first gear 142*a*, and the second gear 144*a* may be arranged to revolve around the rotation shaft 141 while being meshed with the first gear 142*a*, and therefore spinning or rotating with respect to the second rotation axis A2.

Accordingly, the handle cover 120 may be rotated by the revolution shaft 144 and may revolve around the rotation shaft 141. Here, resultant motion may occur as the revolution shaft 144 and the rotation shaft 141 rotate with respect to their respective rotation centers.

In addition, the rotational movement may occur while the revolution shaft 144 is rotated around the rotation shaft 141 along the circumference of the first gear 142*a* with the first gear 142*a* and the second gear 144*a* meshed.

At this time, the rotation angle of the revolution shaft 144 may be configured to be greater than the rotation angle of the rotation shaft 141. A detailed explanation regarding this will be provided in the operation description later.

The elastic member 145 may be disposed so that a first side abuts a hook 143*a* formed in the central region of the link member 143 and a second side abuts the inner surface of the housing 110 to elastically bias the link member 143 toward the second direction D2.

The operation of the driving member 140 may be controlled by an auto flush control unit, which will be described later, and may be operated in a normal operation mode or an accelerated operation mode.

In the normal operation mode, after measuring the rotation angle of any one of the rotation shaft 141, the link member 143, or the revolution shaft 144, the auto flush control unit may determine whether the rotated angle matches a predetermined rotation angle and may control so that the driving portion DP stops when it rotates by a predetermined angle within a predetermined time.

In addition, in the accelerated operation mode, which may be activated in a case where the handle cover 120 cannot operate due to foreign substance or ice in the driving member 140, after measuring the rotation angle of any one of the rotation shaft 141, the link member 143, or the revolution shaft 144, the auto flush control unit may determine whether the rotated angle matches the predetermined rotation angle. In response to determining that the predetermined angle is not obtained within the set time, the driving portion DP may be controlled to operate for a predetermined time at an increased output or a maximum output. If the handle cover 120 cannot operate even after operating once in the accelerated operation mode, the auto flush control unit may be controlled to repeat the same operation again.

In addition, when the handle cover 120 does not complete the rotation at the predetermined rotation angle while operating in the accelerated operation mode, the auto flush control unit may control to restore the state before operation by measuring the rotation angle of any one of the rotation shaft 141, the link member 143, or the revolution shaft 144. By such an operation, the positions of the driving member 140 and the handle cover 120 may be initialized, and the operation may be stopped.

Further, the manual opening module 150 may include a button portion 151 and a linkage arm 152.

The button portion 151 may be disposed on a different surface from the switch 130 within the accommodation space 111*b* inside the housing 110. In such an embodiment, as an example, the switch 130 may be disposed inside the housing 110 on the upper inner surface of the housing 110 above the opening 111, and the button portion 151 may be disposed on the upper left surface.

When the vehicle is completely discharged or in an emergency, a user may forcibly or manually open the handle cover 120 and press the button portion 151 to rotate the linkage arm 152. For example, unlike the switch 130, the button portion 151 may cause the linkage arm 152 to be mechanically rotated by a predetermined range in response to pressure being applied thereto. Accordingly, the distance to which the button portion 151 is required to be pressed by applying pressure may be greater than the displacement distance to activate the switch 130.

The button portion 151 may include a contact piece 153 that extends from the rear center and abuts the linkage arm 152. The contact piece 153 may be rotatably inserted into a proximate side of the linkage arm 152 to maintain the connected state even while the linkage arm 152 rotates.

The linkage arm 152 may include a first frame 154, a proximate end of which is coupled to the contact piece 153, and a second frame 155 that is bent from a distal end of the first frame 154. In some embodiments, the length of the second frame 155 may be longer than the length of the first frame 154. The second frame 155 may be connected to the door latch at a distal end thereof.

With respect to the center of rotation between the first frame 154 and the second frame 155, the second frame 155 may be formed to be longer in length than the first frame 154. Accordingly, when the button portion 151 is pressed, the distal end of the second frame 155 may be displaced by a longer distance compared to the distance that the proximate end of the first frame 154 is displaced by the button press. For example, the amplification ratio of the distance moved while the first frame 154 rotates and the distance moved while the second frame 155 rotates may be at least 1:2 or more.

Figure 3A:
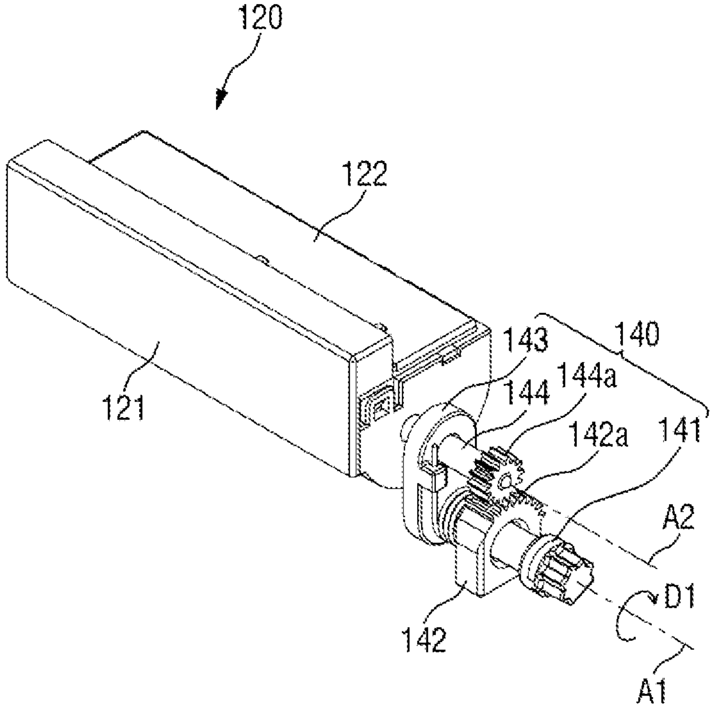
FIGS. 3A and 3B show a closed state of the handle cover of the hidden door handle assembly for a vehicle according to an embodiment of the present disclosure.
Figure 3B:
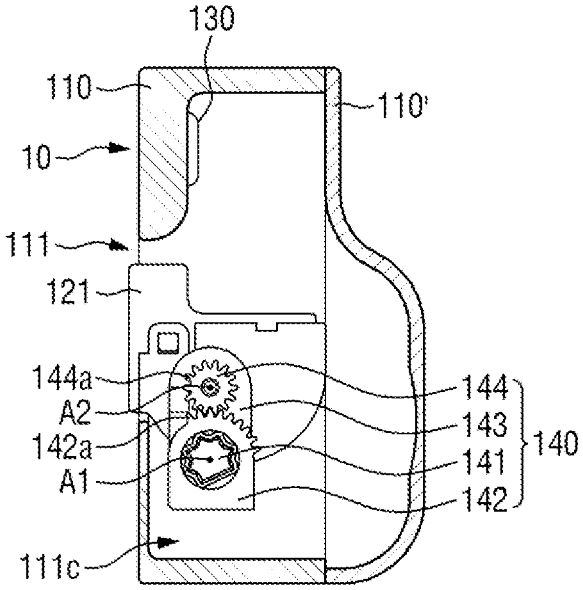
Figure 4A:
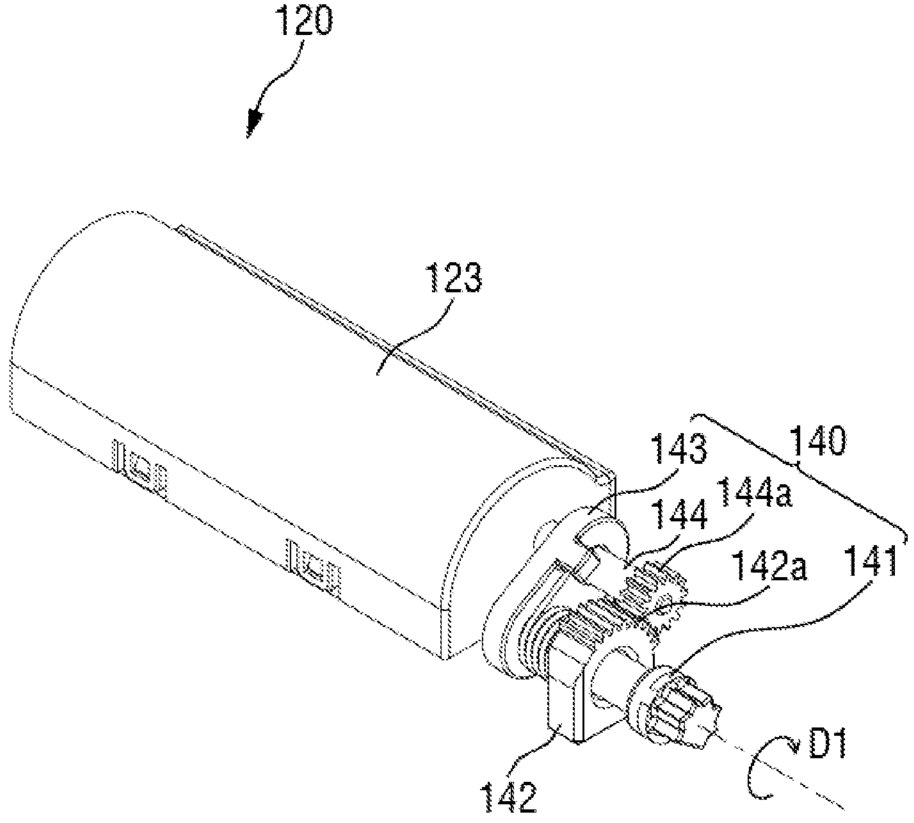
FIGS. 4A and 4B show the handle cover of the hidden door handle assembly for a vehicle according to an embodiment of the present disclosure in a fully opened state.
Figure 4B:
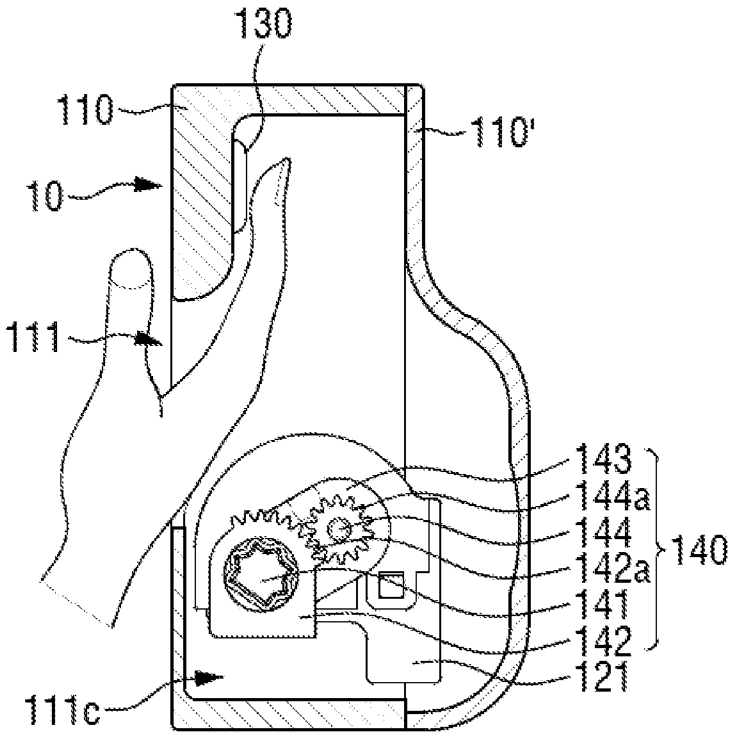

FIGS. 3A and 3B show a closed state of the handle cover of the hidden door handle assembly for a vehicle, and FIGS. 4A and 4B show a fully open state of the handle cover of the hidden door handle assembly for a vehicle.

Referring to FIGS. 3A-4B, in the hidden door handle assembly 100 for a vehicle, the driving member 140 may rotate and move the handle cover 120. FIG. 3A is a perspective view showing the handle cover and the driving member in a door closed state (or opening closed state), and FIG. 3B is a side cross-sectional view of the state.

In FIGS. 3A and 3B, the cover portion 121 of the handle cover 120 may be disposed to close the opening 111, and the cover portion 121 and the link member 143 may be disposed while being erected in the vertical direction.

When the rotation shaft 141 rotates in the first direction D1 (or clockwise based on FIG. 3B), the link member 143 may be rotated simultaneously, and the revolution shaft 144 may be rotated and moved along with the link member 143.

Since the second gear 144*a* of the revolution shaft 144 is arranged to mesh with the first gear 142*a* on the guide gear 142, when the link member 143 rotates along with the rotation shaft 141, the revolution shaft 144 may also be rotated at the same time.

FIG. 4A is a perspective view showing the handle cover and the driving member in the door open state (or opening opened state), and FIG. 4B is a side cross-sectional view of the state.

When the handle cover 120 is completely opened as shown in FIG. 4B from the state in which the rotation shaft

141 and the revolution shaft 144 are vertically arranged as shown in FIG. 3B, the link member 143 may be rotated by about 60° along the first direction D1 with respect to the rotation center of the rotation shaft 141. Correspondingly, the cover portion 121 may be rotated by about 180° from the opening 111. From this description, how the revolution shaft 144 can be rotated more than the rotation angle of the rotation shaft 141 may be explained. Additionally, the first gear 142*a* may have gear teeth formed on at least a part of the outer peripheral surface of the guide gear 142.

Since the handle cover 120 is arranged to move along with the rotation via the driving member 140, the space into which the user can insert his or her hand through the opening 111 into the accommodation space 111*b* (see FIG. 2) of the housing 110 may be significantly increased.

Further, when the user puts the hand into the opening 111 and grasps the housing 110, since the switch 130 is disposed at the position that corresponds to the finger of the user, the vehicle door can be opened by pulling the upper part of the housing 110 or the outer door panel 10 while activating the switch 130. In addition, since this structure does not require a separate door catch, it allows the design to be less restricted, and at the same time, outside air can be prevented from flowing into the cabin space due to the combined structure of the door catch.

Figure 5:
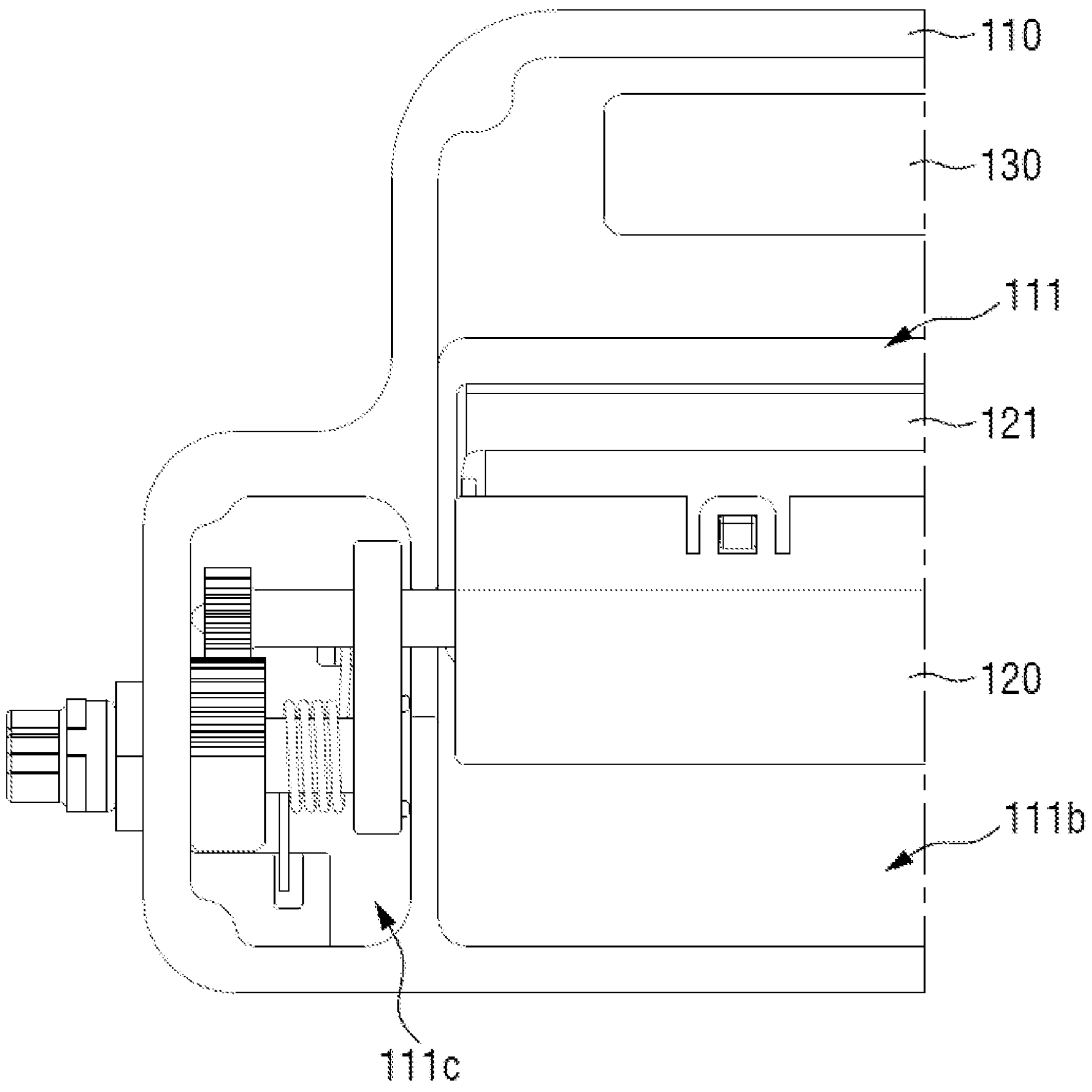
FIG. 5 schematically shows the location of a switch provided inside the housing of the hidden door handle assembly for a vehicle according to an embodiment of the present disclosure.

FIG. 5 schematically shows the location of a switch provided inside the housing of the hidden door handle assembly for a vehicle shown in FIG. 2.

Referring to FIG. 5, the switch 130 may be disposed on the inner upper rear surface of the housing 110. In this embodiment, the switch 130 is shown as an example of being elongated along the longitudinal direction of the opening 111. However, the configuration of the switch 130 is not limited to such an example, and the switch 130 may be provided in, for example, a circular, oval, or polygonal shape having various sizes. Alternatively, a plurality of switches 130 may be arranged in a predetermined pattern, or most of the area on the inner rear surface of the housing 110 may be implemented as the switch 130. The switch 130 may be disposed not only on the inner upper rear surface of the housing 110, but also on the top surface or the back cover 110' (see FIG. 2).

Figure 6:
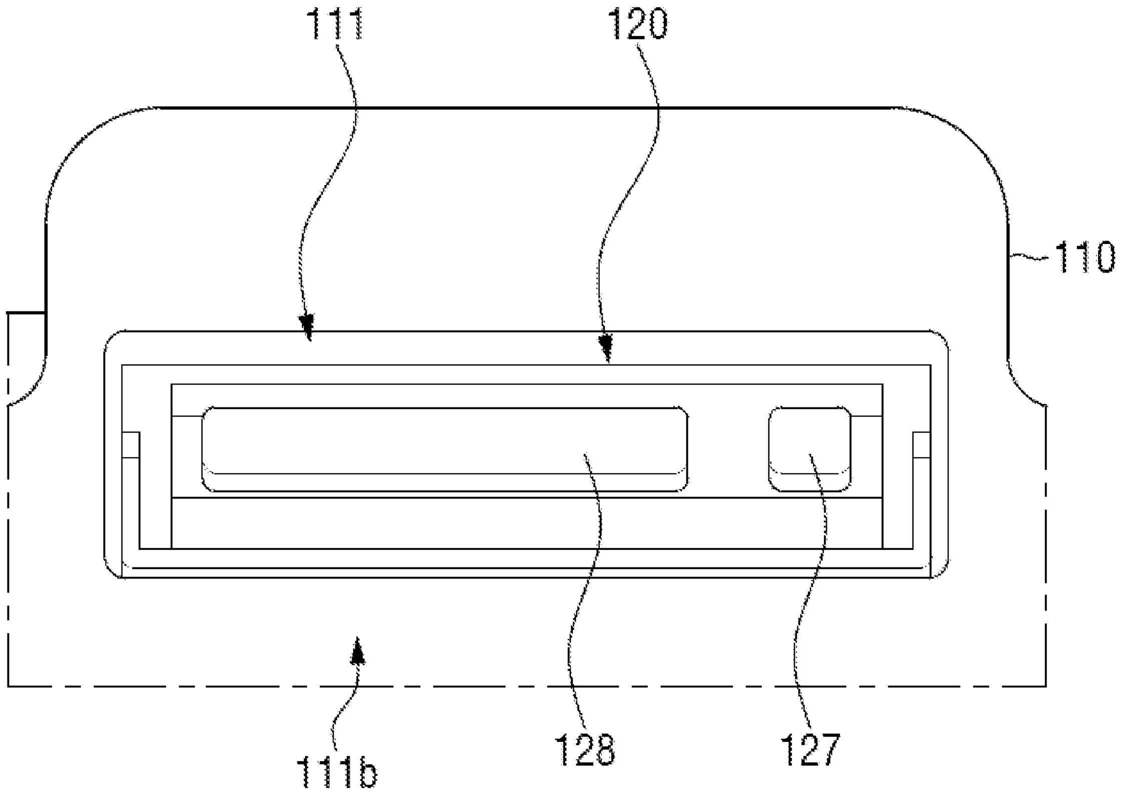
FIG. 6 shows the inside of the handle cover of the hidden door handle assembly for a vehicle according to an embodiment of the present disclosure.
Figure 7:
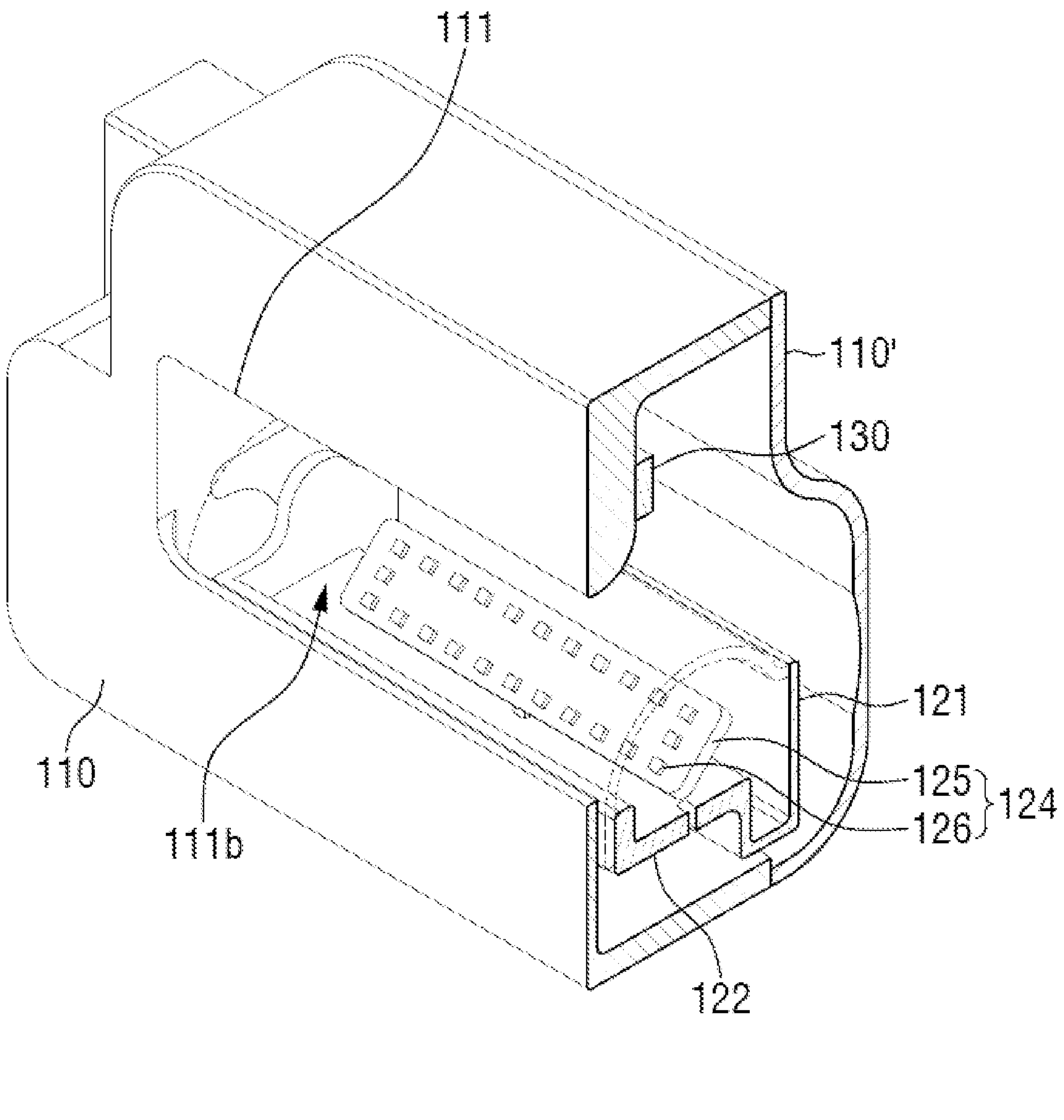
FIG. 7 shows a state in which the lighting portion irradiates light when the handle cover of the hidden door handle assembly for a vehicle according to an embodiment of the present disclosure is rotated.

FIG. 6 shows the inside of the handle cover of the hidden door handle assembly for a vehicle shown in FIG. 3, and FIG. 7 shows a state in which the lighting portion irradiates light when the handle cover of the hidden door handle assembly for a vehicle is rotated.

Referring to FIG. 6, a touch sensor module 127 and an NFC module 128 may be provided on the rear surface of the cover portion 121 of the handle cover 120. For example, when a user touches the front surface of the cover portion 121 that is exposed through the opening 111 while holding a smart key that is authorized for the corresponding vehicle, the touch sensor module 127 may transmit the user's touch data to the auto flush door control unit (AFCU) provided in the vehicle, and the AFCU may determine it as the touch of the approved user and cause the handle cover 120 to be opened.

Additionally or alternatively, for example, when the user touches the front surface of the cover portion 121 that is exposed through the opening 111 with a card or a smartphone equipped with an NFC chip approved for the vehicle, the NFC module 128 may transmit the user's tag data to the AFCU, and the AFCU may determine it as the tag of the approved user and cause the handle cover 120 to be opened.

Further, the auto flush control unit may control the lighting portion 124 to turn on as the handle cover 120 is opened, as shown in FIG. 7.

The lighting portion 124 may illuminate the inside of the accommodation space 111*b*, and more preferably, may irradiate light to a region that corresponds to where the switch 130 is disposed or the active region of the switch 130. For example, if the switch 130 is arranged in an elongated shape as shown in FIG. 5, light may be irradiated substantially entirely to the upper area of the opening 111. If the switch 130 is arranged in a short shape at a specific position, the light may be irradiated around the switch 130 such that the switch region may become brighter.

Figure 8A:
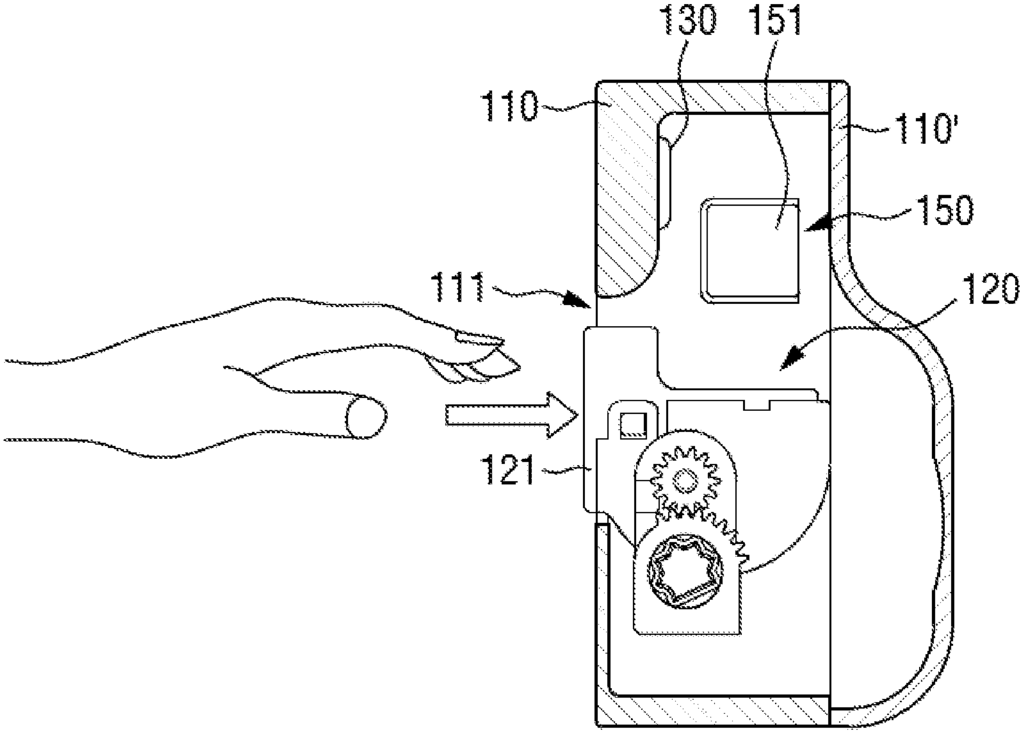
FIGS. 8A and 8B are side cross-sectional views schematically showing a process of opening the hidden door handle assembly for a vehicle according to an embodiment of the present disclosure in an emergency situation.
Figure 8B:
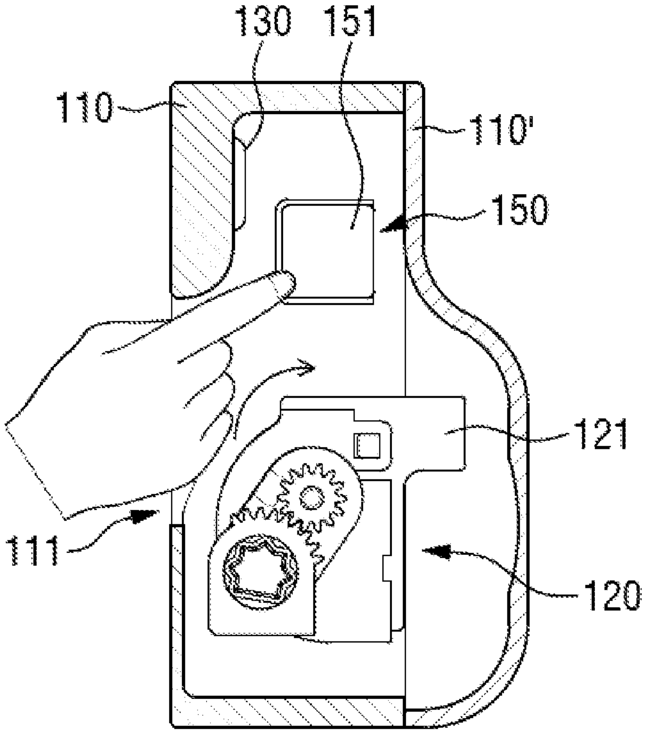

FIGS. 8A and 8B are side cross-sectional views schematically showing a process of opening the hidden door handle assembly for a vehicle in an emergency situation.

FIG. 8A shows a state in which a user forces the rotation of the handle cover 120 to open the door while the vehicle is in a discharged state. For example, when the vehicle is in a discharged state, the handle cover 120 cannot be operated because power cannot be supplied to the driving member 140. In this case, the user or another person may forcibly rotate the handle cover 120 in order to open the door.

FIG. 8B shows a state in which the handle cover 120 is partially opened by a forced rotation. When the handle cover 120 is forcibly rotated, a restoring force may be provided by the elastic member 145 in the direction to close the handle cover 120. Thus, the door may be manually opened by pressing the button portion 151 of the manual opening module 150 while maintaining the handle cover 120 forcibly rotated.

Further, for security purposes, when the driving member 140 has the power, it may be configured that the handle cover 120 is prevented from rotating even if the handle cover 120 is forcibly pushed, and the handle cover 120 may maintain the opening 111 closed. In other words, the user may open the opening 111 only by holding and touching a smart key approved for the vehicle or tagging the NFC chip while the vehicle is normally powered.

Figure 9A:
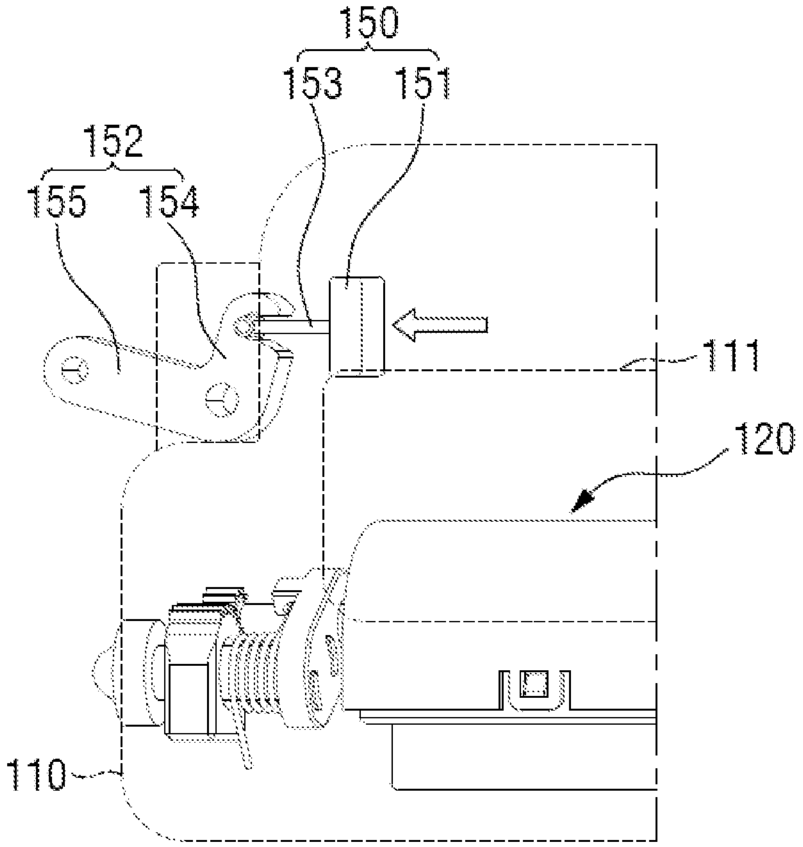
FIGS. 9A and 9B illustrate a process in which the manual opening module of the hidden door handle assembly for a vehicle shown in FIGS. 8A and 8B operates.
Figure 9B:
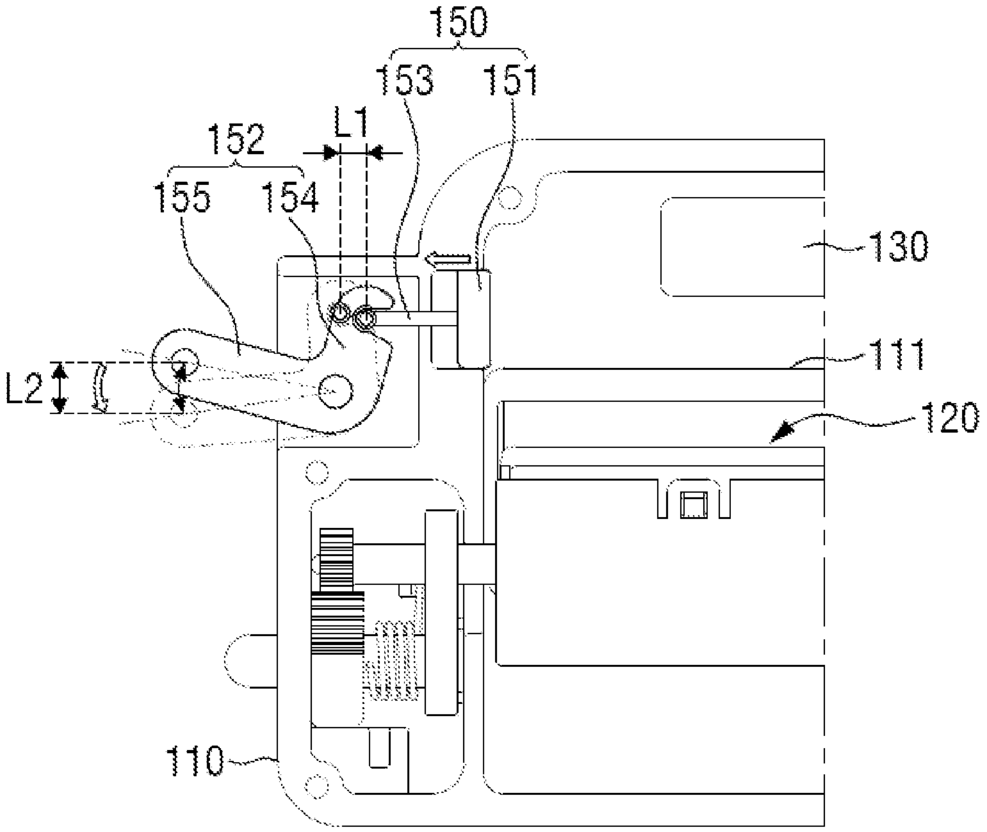

FIGS. 9A and 9B illustrate a process in which a manual opening module operates after the handle cover of the hidden door handle assembly for a vehicle is forcibly opened. Here, FIG. 9A shows a state before the button portion 151 is pressed, and FIG. 9B shows a state in which the linkage arm 152 rotates while the button portion 151 is pressed.

The button portion 151 may protrude from the inner side surface of the housing 110 to allow the user to press it using a finger or other tools.

When the user presses the button portion 151, the contact piece 153 may be linearly translated within the manual operation region provided at the upper part of the driving area 111*c* and may become abutted with the first frame 154, which in turn may rotate the first frame 154.

Then, while rotating with respect to the rotation center of the linkage arm 152 between the first frame 154 and the second frame 155, the distal end of the second frame 155 may be rotated by the distance L2, which is longer than the distance L1 by which the proximate end of the first frame 154 rotates. Accordingly, since the distal end of the second frame 155 is directly or indirectly connected to the door latch, the vehicle door may be opened manually.

Therefore, with the hidden door handle assembly for a vehicle according to embodiments of the present disclosure, the handle cover may be arranged to move along with the rotation, thereby securing a wider space for the user to push his hand into the accommodation space through the opening.

When the handle cover rotates, light may be irradiated by the lighting portion, thereby improving aesthetics and also making it easier to find the switch. Since the handle cover is arranged to cover the accommodation space when the vehicle is being driven or parked, it can prevent or minimize the inflow of outside air and wind noise, and at the same time, it can prevent insects and foreign substances from entering the interior. Further, the door may be allowed to be opened and closed manually when the vehicle's power is completely discharged.

Embodiments of the present disclosure have been described with reference to the accompanying drawings. However, it should be understood that the present disclosure is not limited to these embodiments and can be implemented in various other forms. Those skilled in the art to which the present disclosure pertains will understand that the technical concepts or essential features of the present disclosure can be implemented in different forms without altering their essence. Therefore, the embodiments described above should be considered exemplary and not restrictive in any way.

What is claimed is:

1. A door handle assembly for a vehicle comprising:

a housing having an opening formed on one side;

a handle cover configured to be rotated inside the housing in a first direction to uncover the opening, or to be rotated in a second direction, which is opposite from the first direction, to cover the opening;

a switch provided adjacent to the opening of the housing, the switch being configured to cause a door of the vehicle to be opened in a state where the handle cover uncovers the opening; and a driving mechanism that rotates the handle cover to uncover or cover the opening, wherein the driving mechanism comprises:

an actuator that generates a driving force for rotating the handle cover;

a rotation shaft that rotates about a first rotation axis in response to the driving force transmitted to a proximate end thereof;

a guide gear fixed inside the housing and having a first gear formed on an outer peripheral surface thereof; and a revolution shaft, in which a second gear is provided at one end to mesh with the first gear, that rotates about a second rotation axis and revolves around the rotation shaft, wherein the driving mechanism allows the handle cover to be rotated with respect to the first rotation axis, and at the same time, the second rotation axis, which is spaced apart from the first rotation axis and revolves around the first rotation axis, such that the handle cover is moved by both a translational motion and a rotational motion.

2. The door handle assembly of claim 1, wherein the driving mechanism further comprises:

a link member, a first side of which is coupled to a distal end of the rotation shaft such that the rotation shaft and the link member rotate simultaneously.

3. The door handle assembly of claim 1, wherein a rotation angle of the revolution shaft is formed to be greater than a rotation angle of the rotation shaft.

4. The door handle assembly of claim 1, wherein the driving mechanism is disposed on one side or both sides of the handle cover.

5. The door handle assembly of claim 1, wherein the handle cover comprises:

a cover portion formed to correspond to a shape of the opening and configured to cover the opening; and an extension portion provided at rear of the cover portion to allow an interior space of the housing to be communicated with the opening in response to the cover portion being rotated away from the opening.

6. The door handle assembly of claim 5, wherein the handle cover further comprises:

a reflective cover made of a transparent or translucent material and provided to connect the cover portion and the extension portion, wherein the reflective cover is configured to be visible through the opening as a curved surface; and a lighting portion that is disposed at an inside space between the cover portion and the reflective cover and irradiates light to be transmitted through the reflective cover when the opening is opened.

7. The door handle assembly of claim 6, wherein the switch is disposed in an upper region of the opening within the housing, and wherein, when the opening is opened, the light is irradiated from the lighting portion to illuminate an operating region of the switch.

8. The door handle assembly of claim 1, further comprising:

a manual opening module provided on one side of the opening inside the housing, wherein, in a state in which power to the driving mechanism is cut off, a user is allowed to forcibly rotate the handle cover to expose the opening and reach the manual opening module.

9. The door handle assembly of claim 8, wherein the manual opening module comprises:

a button portion to allow the user to press it; and a linkage arm that rotates to unlock a door latch in response to the button portion being pressed.

10. The door handle assembly of claim 2, wherein the driving mechanism further comprises:

an elastic member that is coupled to the rotation shaft and provides an elastic restoring force to the link member.

* * * * *